Oct. 20, 1970   R. D. GWILLIAM   3,534,911
METHOD OF GRINDING CRUDE NATURAL CHALK
Filed Feb. 5, 1968   2 Sheets-Sheet 1

United States Patent Office 3,534,911
Patented Oct. 20, 1970

3,534,911
METHOD OF GRINDING CRUDE NATURAL CHALK
Ralph Derek Gwilliam, Cornwall, England, assignor to English Clays Lovering Pochin & Company Limited, St. Austel, Cornwall, England, a British company
Filed Feb. 5, 1968, Ser. No. 702,926
Claims priority, application Great Britain, Feb. 9, 1967, 6,346/67
Int. Cl. B02c *17/04, 21/00*
U.S. Cl. 241—16     5 Claims

ABSTRACT OF THE DISCLOSURE

A method of producing a natural chalk whiting which comprises grinding a crude natural chalk containing hard impurities, e.g. flint particles, in an aqueous medium at a solids content in the range of from 60 to 75% by weight and in the presence of 0.05 to 0.50% by weight of a dispersing agent based on the weight of crude chalk. Thereafter the fluid suspension of natural chalk particles which is formed is separated from the hard impurities and dried.

BACKGROUND OF THE INVENTION

Figure 1:
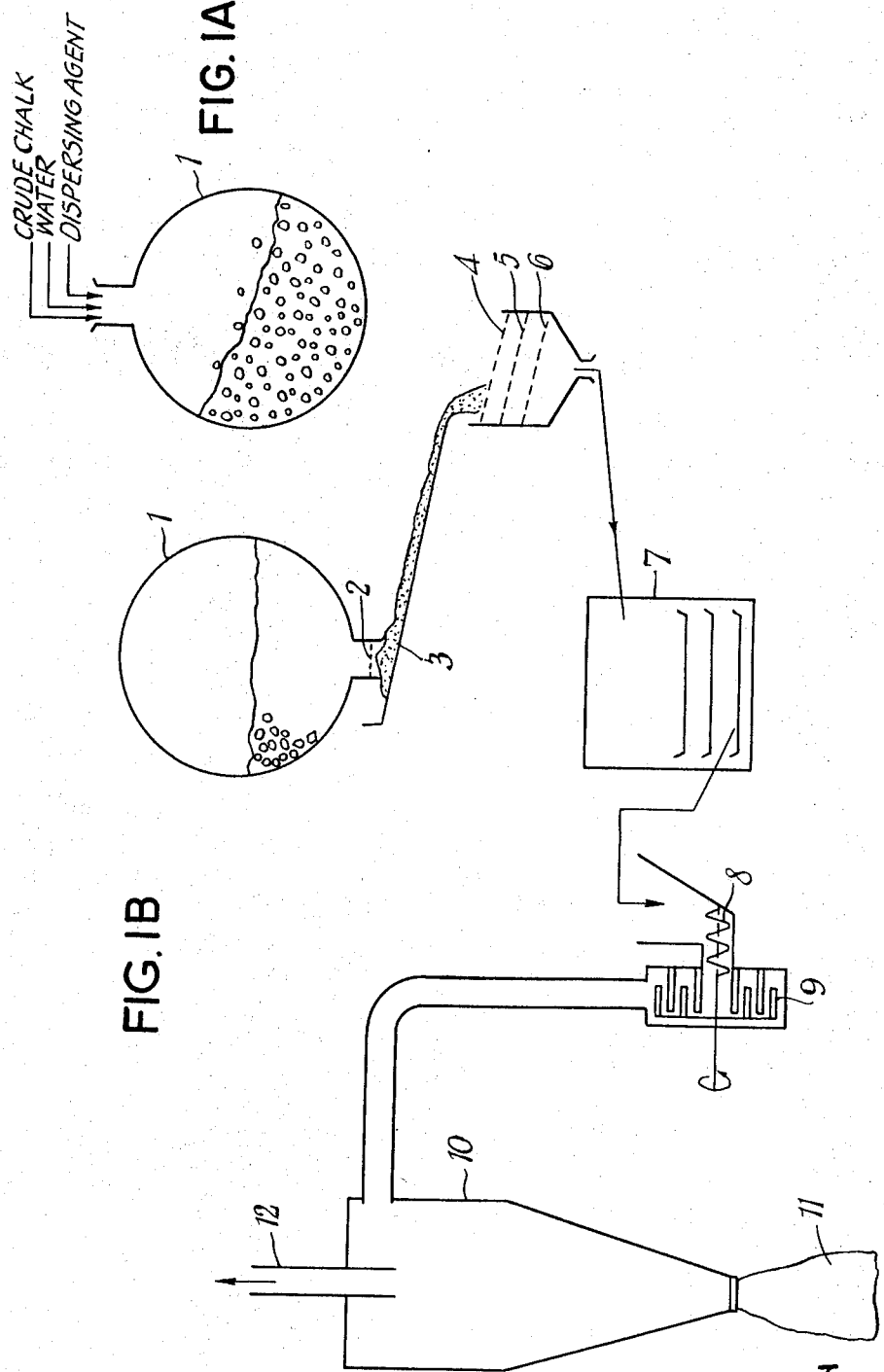

This invention relates to a method of producing a chalk whiting for use in a paper coating composition and to paper coating compositions containing the same.

Chalk whiting, or finely divided calcium carbonate, is being used increasingly as a pigment in compositions for the production of coated paper. The calcium carbonate pigment normally used for this purpose is known as precipitated calcium carbonate and is produced by calcining limestone to form carbon dioxide gas and quicklime. The quicklime is then slaked with water to form milk of lime which is treated in several ways, for example by recombination with carbon dioxide, to give precipitated calcium carbonate. It is also known, see for example United States specifications Nos. 2,345,311 and 2,346,243, to treat a precipitated calcium carbonate pigment for use in a paper coating composition with, for example, 1 or 2% by weight of gum arabic or casein as a dispersing agent to reduce the adhesive demand of the pigment.

An alternative source of chalk whiting is natural chalk. By "natural chalk" there is meant the naturally occurring calcium carbonate which is formed from the remains of coccoliths. Natural chalk consists of calcite crystals in the form of particles mainly having an equivalent spherical diameter in the range of from 1 to 5 microns which, when mined, are loosely bound together to form larger particles, and is to be distinguished from precipitated calcium carbonate and from other calcium carbonate sources such as ground limestone, marble or oyster shells. However, natural chalk occurs in association with various hard impurities, e.g. flint particles, and chalk whiting which is sold for use in paper coating compositions should be substantially free from hard particles, such as flint particles, and should contain at most only a small percentage, say 0.03% by weight, of particles which are of a size greater than No. 300 B.S. sieve. One of the conventional methods of preparing natural chalk whiting includes the step of washing a crude chalk containing hard impurities with water in a roller mill to produce a suspension containing a low concentration of natural chalk in water, i.e. from 10 to 15% by weight solids, from which the hard impurities, e.g. flint particles, can be removed by sedimentation or screening. However, this method requires concentration of the chalk suspension before it is dried and powdered prior to sale; and attempts to work at higher solids concentrations are not successful because of the lack of fluidity of the suspension.

SUMMARY OF THE INVENTION

It has now been found possible to produce a natural chalk whiting having the advantage of the known precipitated calcium carbonate, i.e. having deposited thereon a quantity of a dispersing agent, and at the same time avoiding the disadvantages of the known processes for treating natural chalk in which grinding of a low solids suspension, in order to separate the flint particles therefrom, and concentration of the suspension thus obtained are carried out. More particularly, in accordance with the present invention there is provided a method of producing a natural chalk whiting for use in a paper coating composition which method comprises the steps of (a) grinding a crude natural chalk containing hard impurities in an aqueous medium at a solids content in the range of from 60 to 75% by weight and in the presence of from 0.05 to 0.50% by weight of a dispersing agent, based on the weight of chalk, for a time sufficient to form a fluid suspension of the natural chalk particles, (b) separating the fluid suspension of natural chalk particles thus formed from the hard impurities and (c) drying the suspension of chalk particles to obtain a natural chalk whiting having a dispersing agent deposited thereon.

DESCRIPTION OF THE PREFERRED EMBODIMENTS

As mentioned above, in order for the chalk whiting to be suitable for use in a paper coating composition it should contain not more than about 0.03% by weight of particles larger than No. 300 B.S. sieve. In order to achieve this degree of fineness it has been found to be advantageous first to subject the crude natural chalk containing hard impurities to a light grinding, in the presence of the dispersing agent, which is sufficient to separate the hard impurities from the chalk and to form the fluid suspension, then to separate the hard impurities from the fluid suspension, and to complete the grinding of the natural chalk suspension in the presence of the dispersing agent. This operation may be effected either before or after the drying of the chalk suspension. Thus, in one embodiment the chalk suspension containing the dispersing agent but free of hard impurities is ground with a particulate grinding material, for example quartz grains. Alternatively, in another embodiment, the chalk whiting obtained by drying the chalk suspension from which the hard impurities have been removed is ground in the dry state, for example in a hammer mill.

The dispersing agent used in the method of the present invention can be, for example, a salt of a polyphosphoric acid, a salt of a polysilicic acid, a salt of a polyacrylic acid, a salt of a polymethacrylic acid, a dinaphthylmethane sulphonate, a lignosulphonate or an alginate, e.g. sodium alginate. The amount of dispersing agent required to obtain a good dispersion of the natural chalk whiting when the latter is incorporated in a paper coating composition is fairly critical. The quantity which should be used in any particular case will depend on the nature of the dispersing agent and on the specific surface area or, in other words, the particle size distribution of the chalk whiting. The higher the specific surface area of the chalk whiting the higher the amount of dispersing agent required. With the natural chalk whiting prepared by the method of the present invention it has been found that the amount of dispersing agent used should be in the range 0.05 to 0.50%, and preferably 0.05 to 0.20%, by weight based on the weight of chalk whiting. The amount of dispersing agent added to the crude natural chalk containing hard impurities will, therefore, depend on the amount of dispersing agent required by a paper coating composition in which the chalk whiting is to be incorporated, but in general it is found that if that amount of dispersing agent required in the paper coating composition is added to the crude natural chalk satisfactory results are obtained. Accordingly, in the method of the present invention from 0.05 to 0.50% and, preferably 0.05 to 0.20%, by weight of dispersing agent is used in the initial grinding of the crude natural chalk.

Crude natural chalk as mined normally contains about 20% by weight of water so that the addition thereto of a further 5% by weight of water, together with the dispersing agent, is normally sufficient to produce a material suitable for carrying out step (a) of the method of the present invention.

The crude natural chalk containing the hard impurities can be worked, for example, in a pebble mill. After a short grinding time, generally of the order of 10 to 20 minutes, the chalk particles are separated from the flint pieces and are dispersed into a fluid slurry which can be discharged from the pebble mill leaving the flint pieces behind. The large flint pieces can be retained in the pebble mill as part of the grinding charge for several runs, after which they can be removed to reduce the charge of grinding pebbles to the original quantity.

The chalk slurry containing the dispersing agent which is produced and which is advantageously at a solids content of about 70% can then be easily screened through a succession of sieves to produce a slurry free from particles coarser than No. 300 B.S. sieve. Other methods of particle size classification e.g. elutriation or sedimentation, can be used. The product thus obtained can then be dried by a conventional drying system, for example in a heated impact mill, to produce a powdered flint-free product. Other methods of drying e.g. a rotary dryer, a spray dryer or a tray dryer, can be used.

The invention will be further illustrated by reference to the accompanying drawings in which: FIGS. 1A and 1B show schematically the construction and operation of a first embodiment of a plant for producing a natural chalk whiting in accordance with the present invention; and FIG. 2 shows a second embodiment of a plant.

Referring first to FIG. 1A, a crude natural chalk as mined, together with about 5% by weight of water and about 0.1% by weight of a dispersing agent based on the weight of dry crude chalk, is fed to a pebble mill 1 and is ground therein for about 15 minutes with the pebble mill in an upright position. At the completion of the grinding time, the pebble mill is stopped and rotated to the position B shown in FIG. 2B so that the chalk suspension can be drained out of the pebble mill through a plate 2, which is drilled with ¼ inch diameter holes on to an inclined conduit 3. The chalk suspension is fed to a series of screens 4, 5 and 6 of increasing fineness; for example, screen 4 may be a No. 60 mesh B.S. sieve, screen 5 a No. 100 mesh B.S. sieve and screen 6 a No. 300 mesh B.S. sieve. The oversize material can be removed from the surface of each screen and may be returned to the pebble mill 1 for further grinding. The suspension, which now essentially comprises particles smaller than a No. 300 mesh B.S. sieve, is dried in a tray dryer 7, and the dry chalk lumps are fed by means of a screw conveyor 8 to a hammer mill 9 wherein the material is ground to a fine powder containing not more than 0.03% by weight of particles larger than a No. 300 mesh B.S. sieve. The pulverised chalk whiting is drawn by vacuum into a cyclonic separator 10 and the dry powder is separated from the air and collected in a bag 11. The air with some entrained dust is exhausted to atmosphere through the duct 12 and a bag filter (not shown).

Figure 2:
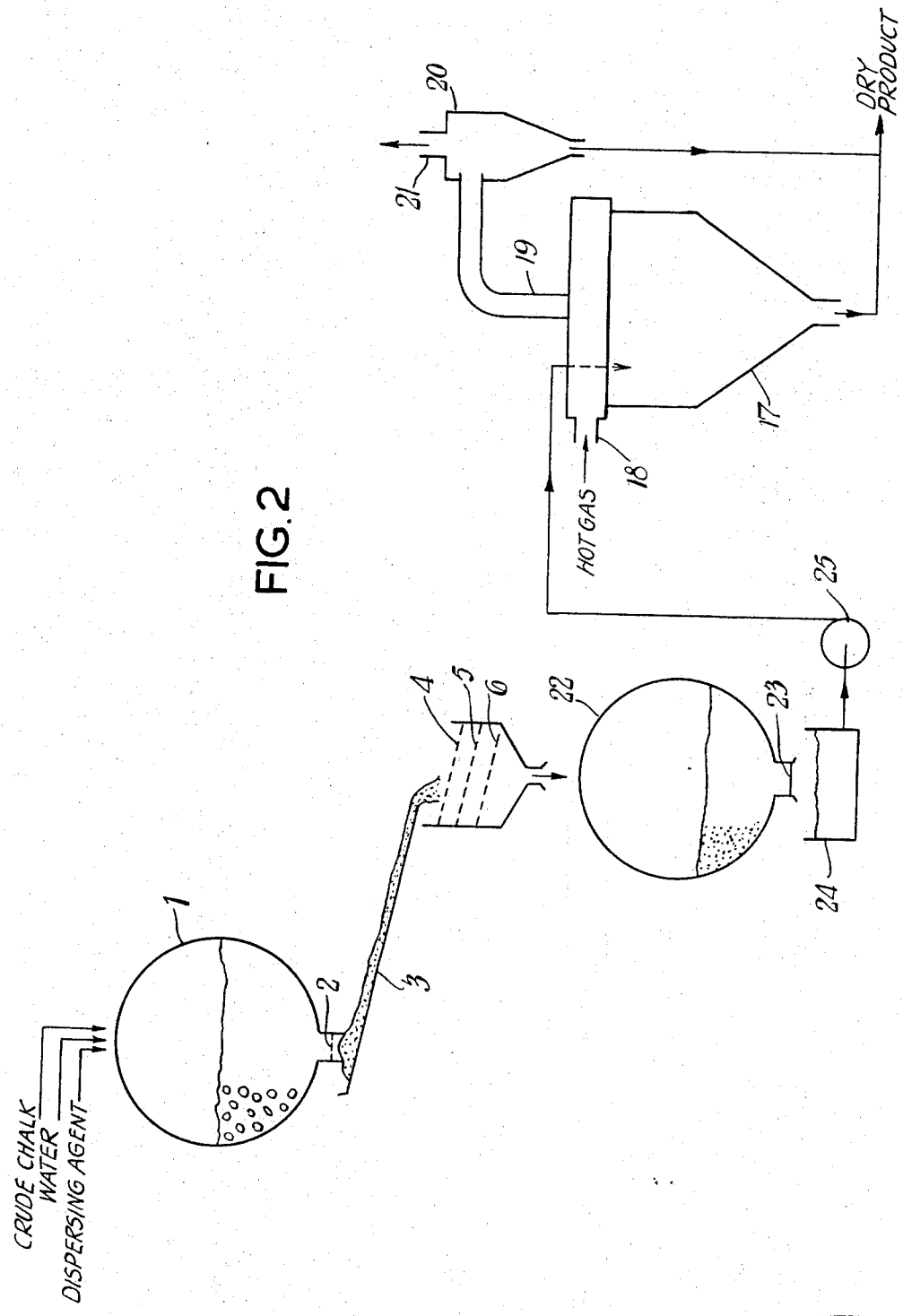

Referring now to FIG. 2 it will be seen that the chalk suspension from which the hard impurities have been removed and which is at a solids content of about 70% by weight is discharged from the pebble mill 1 and is fed to a mill 22 containing a particulate grinding medium, for example quartz grains, consisting of particles in the size range of from ½ inch to No. 100 B.S. sieve, and preferably from −8 to +30 B.S. sieve, and ground therein in the presence of the dispersing agent for a time sufficient to produce a natural chalk whiting of the required degree of fineness. The chalk suspension is then drained from the mill through a foraminous plate 23 with holes of a size such that the particulate grinding medium is retained in the mill. The suspension flows into a sump 24 from which it is supplied by means of a pump 25 to a spray dryer 17 which is supplied with hot gases through a duct 18. The gases are exhausted through a duct 19 to a cyclonic separator 20 which separates any spray dried chalk particles from the gases. The particles from the bottom of the cyclonic separator 20 are added to those from the spray dryer 17 and the gases are vented to atmosphere through a duct 21 and a bag filter (not shown).

The invention is further illustrated by the following example.

EXAMPLE

Using a plant of the type shown in FIG. 1, two tons of crude chalk were charged to a seven foot long, six foot diameter pebble mill, which was driven at 20 r.p.m. by a 20 h.p. motor and which contained a charge of 6 tons of flint pebbles with a size range of 1½ inches to ¼ inch. Thirty gallons of water and 4½ pounds of a sodium salt of polyacrylic acid having a degree of polymerisation of about 40 were added and the mill was run for 15 minutes to separate the flint particles from the chalk. After this time the mill was stopped and the suspension of chalk was run out of the mill through a ¼ inch screen. The suspension was then sieved successively through a No. 60 mesh B.S. sieve, a No. 100 mesh B.S. sieve and a No. 300 mesh B.S. sieve. The sieved suspension was dried in a tray dryer, and the dried natural chalk whiting milled in a hammer mill and then collected in a bag. The product thus obtained had a particle size analysis which showed 0.03% greater than No. 300 mesh B.S. sieve, 17% greater than 10 microns equivalent spherical diameter and 34% finer than 2 microns equivalent spherical diameter.

An attempt was made to repeat the procedure described above without using the dispersing agent when grinding the crude natural chalk containing the flint particles but it was found that the chalk could not be processed. More particularly, the hard crude chalk was only converted into a slightly softer chalk, the end product consisting of some softened chalk, some undispersed chalk lumps and some flint attached to the chalk, and having a consistency similar to that of very sticky putty.

A sample of natural chalk whiting prepared in accordance with the method of the present invention was compared with a sample of a normal, commercially-available natural chalk whiting having no dispersing agent deposited thereon. Both natural chalk whiting samples were formed into a slurry having a solids content of 78% using a laboratory dispersion mill. With the normal commercially-available chalk whiting dispersion was achieved in one hour whereas with the natural chalk whiting having the dispersing agent deposited thereon and prepared in accordance with the method of the invention dispersion was completed in 25 minutes. Both chalk whiting slurries were blended with a slurry of a coating clay, which contained 75% by weight of particles smaller than 2 microns equivalent spherical diameter and 0.2% by weight of particles larger than 10 microns equivalent spherical diameter, in the proportion necessary to form a pigment containing 75% clay and 25% natural chalk whiting. Paper coating compositions were prepared in the normal manner from each sample using 100 parts by weight of pigment and an adhesive consisting of 10 parts by weight of starch (Viscosol 310) and 10 parts by weight of a styrene-butadiene polymer latex (Dow Latex 636).

Coated sheets of paper were then prepared using a trailing blade coater working at a paper speed of 1500 ft./min. and adjusted to give a coating weight of 10 grams per square metre. The coated sheets had the following properties:

|  | Gloss: TAPPI units | I.G.T. Pick velocity ft./min. |
|---|---|---|
| Commercially-available chalk whiting without dispersing agent | 32.5 | 315 |
| Natural chalk whiting prepared in accordance with the invention | 37.6 | 354 |

What is claimed is:

1. A method of producing a natural chalk whiting for use in a paper coating composition which method comprises the steps of:
   (a) grinding a crude natural chalk containing hard impurities in an aqueous medium at a solids content in the range of from 60 to 75% by weight and in the presence of 0.05 to 0.50% by weight of a dispersing agent, based on the weight of crude chalk, for a time sufficient to form a fluid suspension of the natural chalk particles;
   (b) separating the fluid suspension of natural chalk particles thus formed from the hard impurities; and
   (c) drying the suspension of chalk particles to obtain a natural chalk whiting having a dispersing agent deposited thereon.

2. A method according to claim 1, wherein the crude natural chalk containing hard impurities is ground in an aqueous medium containing from 0.05 to 0.20% by weight of the dispersing agent, based on the weight of crude chalk.

3. A method according to claim 1, wherein the chalk particles from which the hard impurities have been separated are further ground to obtain a chalk whiting containing not more then 0.03% by weight of particles larger than a No. 300 mesh B.S. sieve.

4. A method according to claim 1, wherein the dispersing agent is selected from the group consisting of salts of polyphosphoric acids, salts of polysilicic acids, salts of polyacrylic acids, salts of polymethacrylic acids, dinaphthylmethane sulphonates, lignosulphonates and alginates.

5. A method as in claim 1 wherein the dispersing agent is a salt selected from the group consisting of salts of polyacrylic acid and salts of polymethacrylic acid.

References Cited

UNITED STATES PATENTS

| 1,328,299 | 1/1920 | Ryan. | |
| 2,526,519 | 10/1950 | Vogel-Jorgensen | 241—24 X |
| 2,668,749 | 2/1954 | McHan | 241—16 X |
| 3,029,153 | 4/1962 | Hackley | 106—306 X |
| 3,133,824 | 5/1964 | Podschus | 106—306 |
| 3,197,322 | 7/1965 | Maskal | 106—306 |

ROBERT C. RIORDON, Primary Examiner

D. G. KELLY Assistant Examiner

U.S. Cl. X.R.

241—18